(12) United States Patent
Suttile et al.

(10) Patent No.: US 6,760,640 B2
(45) Date of Patent: Jul. 6, 2004

(54) AUTOMATED MANUFACTURING SYSTEM AND METHOD FOR PROCESSING PHOTOMASKS

(75) Inventors: Edward J. Suttile, Oxford, CT (US); Charles Croke, Waterbury, CT (US); James P. Morrison, Sandy Hook, CT (US); Ryan T. Vo, San Jose, CA (US); Peter F. Jones, New Hartford, CT (US); Mary R. Spano, Danbury, CT (US); Edward Arthur Mills, Malabar, FL (US)

(73) Assignee: Photronics, Inc., Jupiter, FL (US)

( * ) Notice: Subject to any disclaimer, the term of this patent is extended or adjusted under 35 U.S.C. 154(b) by 58 days.

(21) Appl. No.: 10/099,622

(22) Filed: Mar. 14, 2002

(65) Prior Publication Data

US 2003/0177469 A1 Sep. 18, 2003

(51) Int. Cl.[7] .............................................. G06F 19/00
(52) U.S. Cl. ........................... 700/121; 716/19; 700/97
(58) Field of Search .......................... 700/174, 97, 121; 716/19–21

(56) References Cited

U.S. PATENT DOCUMENTS

| | | | |
|---|---|---|---|
| 3,900,737 A | | 8/1975 | Collier et al. |
| 5,563,702 A | | 10/1996 | Emery et al. |
| 5,933,350 A | * | 8/1999 | Fujimoto et al. ............ 700/121 |
| 6,330,708 B1 | * | 12/2001 | Parker et al. .................. 716/19 |
| 6,453,345 B2 | * | 9/2002 | Trcka et al. ................. 709/224 |
| 6,622,295 B1 | * | 9/2003 | Schepp et al. ................. 716/19 |
| 2003/0023336 A1 | * | 1/2003 | Kreidler et al. ............. 700/108 |

FOREIGN PATENT DOCUMENTS

WO    WO 02/03141 A2    1/2002

OTHER PUBLICATIONS

Photronics, Screenshots from AlignRite system (9 sheets) see attached page "Description of AlignRite Screenshots".

* cited by examiner

*Primary Examiner*—Leo Picard
*Assistant Examiner*—Alexander Kosowski
(74) *Attorney, Agent, or Firm*—Amster, Rothstein & Ebenstein LLP

(57) ABSTRACT

The present invention relates generally to an automated manufacturing system and method for manufacturing photomasks wherein information provided by a customer at a remote location is interfaced, via a network, to a photomask manufacturer's computer system and automatically processes data for manufacturing a photomask and automatically formats and routes data to processing equipment. The present invention reduces the need for manual intervention, thereby avoiding costly delays and transcription errors associated therewith. The software of the present invention provides for automatic generation of data arrays, which can be used to process and monitor the status of a photomask during manufacture. Further, the software is capable of automatically modifying design data provided by a photomask user. Additionally, the software of the present invention includes an automatic messaging system which can notify users of the system, of status and errors in manufacture of photomasks. The present invention also includes a real time monitoring system capable of notifying users of the status and errors in the processing of the photomask during manufacture.

30 Claims, 6 Drawing Sheets

AUTOMATED MANUFACTURING SYSTEM AND METHOD FOR PROCESSING PHOTOMASKS

FIELD OF THE INVENTION

The present invention relates generally to an automated manufacturing system and method for manufacturing photomasks wherein information provided by a customer at a remote location is interfaced, via a network, to a photomask manufacturer's computer system and automatically processes data for manufacturing a photomask and automatically formats and routes data to processing equipment. The present invention reduces the need for manual intervention, thereby avoiding costly delays and transcription errors associated therewith.

BACKGROUND OF THE INVENTION

Photomasks are high precision plates containing microscopic images of electronic circuits. Photomasks are typically made from very flat pieces of quartz or glass with a layer of chrome on one side. Etched in the chrome is a portion of an electronic circuit design. This circuit design on the mask is also called geometry.

A typical photomask used in the production of semiconductor devices is formed from a "blank" or "undeveloped" photomask. As shown in FIG. 1, a typical blank photomask 10 is comprised of three or four layers. The first layer 11 is a layer of quartz or other substantially transparent material, commonly referred to as the substrate. The next layer is typically a layer of opaque material 12, such as Cr, which often includes a third layer of antireflective material 13, such as CrO. The antireflective layer, may or may not be included in any given photomask. The top layer is typically a layer of photosensitive resist material 14. Other types of photomasks are also known and used including, but not limited to, phase shift masks, embedded attenuated or alternating aperature phase shift masks.

The desired pattern of opaque material 12 to be created on the photomask 10 may be defined by an electronic data file loaded into an exposure system which typically scans an electron beam (E-beam) or laser beam in a raster or vector fashion across the blank photomask. One such example of a raster scan exposure system is described in U.S. Pat. No. 3,900,737 to Collier. Each unique exposure system has its own software and format for processing data to instruct the equipment in exposing the blank photomask. As the E-beam or laser beam is scanned across the blank photomask 10, the exposure system directs the E-beam or laser beam at addressable locations on the photomask as defined by the electronic data file. The areas of the photosensitive resist material that are exposed to the E-beam or laser beam become soluble while the unexposed portions remain insoluble.

In order to determine where the e-beam or laser should expose the photoresist 14 on the blank photomask 10, and where it should not, appropriate instructions to the processing equipment need to be provided, in the form of a jobdeck. In order to create the jobdeck the images of the desired pattern are broken up (or fractured) into smaller standardized shapes, e.g., rectangles and trapezoids. The fracturing process can be very time consuming. After being fractured, the image may need to be further modified by, for example, sizing the data if needed, rotating the data if needed, adding fiducial and internal reference marks, etc. Typically a dedicated computer system is used to perform the fracturing and/or create the jobdecks. The jobdeck data must then be transferred to the processing tools, to provide such tools with the necessary instructions to expose the photomask.

As shown in FIG. 2, after the exposure system has scanned the desired image onto the photosensitive resist material 14, the soluble photosensitive resist material is removed by means well known in the art, and the unexposed, insoluble photosensitive resist material 14' remains adhered to the opaque material 13 and 12. Thus, the pattern to be formed on the photomask 10 is formed by the remaining photosensitive resist material 14'.

The pattern is then transferred from the remaining photoresist material 14' to the photomask 10 via known etch processes to remove the antireflective material 13 and opaque materials 12 in regions which are not covered by the remaining photoresist 14'. There are a wide variety of etching processes known in the art, including dry etching as well as wet etching, and thus a wide variety of equipment used to perform such etching. After etching is complete, the remaining photoresist material 14' is stripped or removed and the photomask is completed, as shown in FIG. 3. In the completed photomask, the pattern as previously reflected by the remaining antireflective material 13' and opaque materials 12' are located in regions where the remaining photoresist 14' remain after the soluble materials were removed in prior steps.

In order to determine if there are any unacceptable defects in a particular photomask, it is necessary to inspect the photomasks. A defect is any flaw affecting the geometry. This includes chrome where it should not be (chrome spots, chrome extensions, chrome bridging between geometry) or unwanted clear areas (pin holes, clear extensions, clear breaks). A defect can cause the customer's circuit not to function. The customer will indicate in its defect specification the size of defects that will affect their process. All defects that size and larger must be repaired, or if they can not be repaired the mask must be rejected and rewritten.

Typically, automated mask inspection systems, such as those manufactured by KLA Instruments Corporation or ETEC, an Applied Materials company, are used to detect defects. Such automated systems direct an illumination beam at the photomask and detect the intensity of the portion of the light beam transmitted through and reflected back from the photomask. The detected light intensity is then compared with expected light intensity, and any deviation is noted as a defect. The details of one system, can be found in U.S. Pat. No. 5,563,702 assigned to KLA Instruments Corporation.

After passing inspection, a completed photomask is cleaned of contaminants. Next, a pellicle may be applied to the completed photomask to protect its critical pattern region from airborne contamination. Subsequent through pellicle defect inspection may be performed. Sometimes either before or after a pellicle is applied, the photomask may be cut. After these steps are completed, the completed photomask is sent to a customer for use to manufacture semiconductor and other products. In particular, photomasks are commonly used in the semiconductor industry to transfer micro-scale images defining a semiconductor circuit onto a silicon or gallium arsenide substrate or wafer. The process for transferring an image from a photomask to a silicon substrate or wafer is commonly referred to as lithography or microlithography.

Typically, as shown in FIG. 4, the semiconductor manufacturing process comprises the steps of deposition, photolithography, and etching. During deposition, a layer of either electrically insulating or electrically conductive material (like a metal, polysilicon or oxide) is deposited on the surface of a silicon wafer. This material is then coated with a photosensitive resist. The photomask is then used much the same way a photographic negative is used to make a photograph. Photolithography involves projecting the image on the photomask onto the wafer. If the image on the photomask is projected several times side by side onto the wafer, this is known as stepping and the photomask is called a reticle.

As shown in FIG. 5, to create an image 21 on a semiconductor wafer 20, a photomask 10 is interposed between the semiconductor wafer 20, which includes a layer of photosensitive material, and an optical system 22. Energy generated by an energy source 23, commonly referred to as a Stepper, is inhibited from passing through the areas of the photomask 10 where the opaque material are present. Energy from the Stepper 23 passes through the transparent portions of the quartz substrate 11 not covered by the opaque material 12 and the antireflective material 13. The optical system 22 projects a scaled image 24 of the pattern of the opaque material 12 and 13 onto the semiconductor wafer 20 and causes a reaction in the photosensitive material on the semiconductor wafer. The solubility of the photosensistive material is changed in areas exposed to the energy. In the case of a positive photolithographic process, the exposed photosensistive material becomes soluble and can be removed. In the case of a negative photolithographic process, the exposed photosensistive material becomes insoluble and unexposed soluble photosensistive material is removed.

After the soluble photosensitive material is removed, the image or pattern formed in the insoluble photosensitive material is transferred to the substrate by a process well known in the art which is commonly referred to as etching. Once the pattern is etched onto the substrate material, the remaining resist is removed resulting in a finished product. A new layer of material and resist is then deposited on the wafer and the image on the next photomask is projected onto it. Again the wafer is developed and etched. This process is repeated until the circuit is complete. Because, in a typical semiconductor device many layers may be deposited, many different photomasks may be necessary for the manufacture of even a single semiconductor device. Indeed, if more than one piece of equipment is used by a semiconductor manufacturer to manufacture a semiconductor device, it is possible more than one photomask may be needed, even for each layer. Furthermore, because different types of equipment may also be used to expose the photoresist in the different production lines, even the multiple identical photomask patterns may require additional variations in sizing, orientation, scaling and other attributes to account for differences in the semiconductor manufacturing equipment. Similar adjustments may also be necessary to account for differences in the photomask manufacturer's lithography equipment. These differences need to be accounted for in the photomask manufacturing process. Heretofore, the only way known to account for such differences involved manual intervention by an operator to change the data being provided to processing equipment.

A critical aspect in the manufacture of a photomasks is to reduce the time it takes from receiving an order to providing a customer with a photomask. In a typical photomask production, a lot of steps are necessary to perform the tasks necessary to form a completed photomask.

First, the order must be taken, and the customers information regarding the photomask to be manufactured and billing or other processing information must be taken. In the past, this information has been provided either manually in hard copy, or electronically in the form of a floppy disk, magnetic tape, cassette tape or by modem.

Once the photomask manufacturer receives the necessary information, operators are then required to sort through the information received and manually forward to the appropriate processing station or department the information provided. For example, the billing information would have to be forwarded to the billing department, and pattern data necessary to perform the fracturing needs to be provided to the fracturing computer, and the remaining jobdeck information would have to be forwarded to the appropriate processing station. If information is provided in a different format than the manufacturers computer provides, this fact would also need to be identified manually, and then the file converted to an appropriate format. If the photomask manufacturer desired to track the progress of the photomask in production, it was necessary to individually contact each station and ascertain the status from the operator. To the extent that the semiconductor manufacturer needs the same pattern to be used by multiple different machines, an operator is required to manually program the fracturing computer to make appropriate modifications. Similarly, to the extent certain customer's specified format needs to be modified due to photomask manufacturing processes being used, these types of modifications of data input to the fracturing computer also heretofore needed to be entered manually by an operator. The prior art systems provide no way to automatically account and handle these variations.

A long standing problem in the photomask production industry is how to reduce the time it takes from receipt of a customer order to formation and delivery of the processed photomask. Some ways used in the past to expedite this process has been the creation of industry standards, such as the SEMI P10 standard which has been modified and updated over the years, which dictate the form in which data should be electronically provided to photomask manufacturers. While such standards are helpful, they have not in and of themselves achieved a seamless automation of the processing of information necessary in the manufacture of the photomasks.

In the past, one of our predecessor organizations, AlignRite Corporation, attempted to expedite the delivery of the electronic data by use of an Internet based delivery system. However, although the AlignRite System was capable of rapid delivery of the photomask data from the customer to the computer system of the photomask manufacturer and was capable of validating the accuracy of this data in real time, this prior system did not provide for a fully automated process upon receipt of the information. Operators were still necessary to identify and process the electronic data upon receipt. Standard modifications to the data that may be customer dependent or facility dependent would also have to entered manually by operators. Each time a manual change would have to be entered the risk of human error increased, and the overall length of the job would be extended.

Others have disclosed systems in which manufacturing and billing data are down-loaded over the Internet and verified on-line automatically. This system is described in PCT Publication Number 02/03141, published on Jan. 10, 2002 to DuPont Photomask, Inc. After requiring the data provided to be in a specified uniform format, this system generally describes that the data is electronically processed. While this system discloses the use of the data electronically received and on-line verified to be used in billing systems and for fracturing systems, this system does not provide for automatic transfer of data between these systems and other systems. This system also does not provide any flexibility for the acceptance of varying forms of data, as the verification process disclosed requires a specified uniform format. Further, this system also does not account for other order variables that need to be modified in the jobdeck and thus are likely to require human intervention. This system also fails to provide an automated and interactive monitoring system which will provide for prompt identification and notification of status and errors, while optionally allowing an operator to manually intervene and correct such errors.

It is another object of the present invention to eliminate manual intervention in the transmission and processing of customer data for manufacture of a photomask.

It is another object of the present invention to reduce the lead time and total processing time it takes from the time that a photomask manufacturer receives the necessary processing information from a customer to the time it takes to deliver the finished photomask to that customer.

It is another object of the present invention to improve the accuracy and efficiency in which customer photomask data is processed and transmitted for manufacture.

It is another object of the present invention to solve the shortcomings of the prior art.

Other objects will become apparent from the foregoing description.

SUMMARY OF THE INVENTION

The present invention relates generally to an automated manufacturing system and method for manufacturing photomasks wherein information provided by a customer at a remote location is interfaced, via a network, to a photomask manufacturer's computer system and automatically processes data for manufacturing a photomask and automatically formats and routes data to processing equipment. The present invention reduces the need for manual intervention, thereby avoiding costly delays and transcription errors associated therewith.

It has now been found that the above and related objects of the present invention are obtained in the form of, albeit illustrative, an automated system used for manufacturing a photomask comprising:

at least one server for electronically receiving photomask design data from a photomask customer;

software for processing said photomask design data, wherein said software for processing is configured to automatically extract information from said customer design data and arrange said extracted data in different formats suitable for specified photomask manufacturing tasks; and wherein said software for processing modifies said extracted information to account for the processing steps that are intended to actually be performed in manufacturing said photomask;

a data array for storing said extracted and arranged information;

a plurality of photomask manufacturing task stations interfaced to said data array;

at least one processing tool used in the manufacture of photomask to perform said photomask manufacturing tasks; and software for tracking the status of the at least one processing tool in real time and notifying one or more system users of said status.

BRIEF DESCRIPTION OF THE DRAWINGS

In the detailed description of the preferred embodiment, reference is made to the accompanying figures, albeit illustrative, wherein.

DETAILED DESCRIPTION OF THE INVENTION

Figure 1:
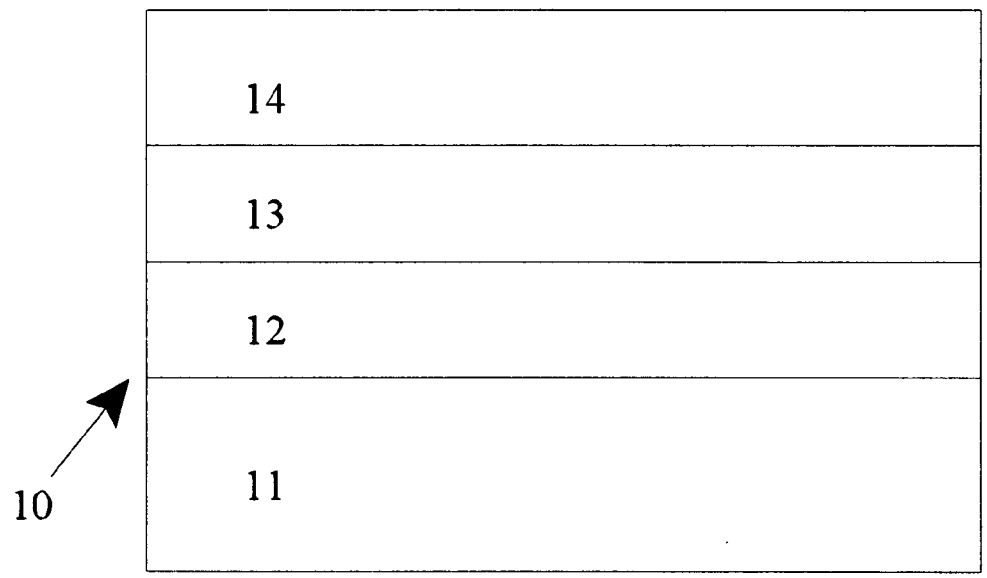
FIG. 1 shows the four layers in a typical blank photomask.
Figure 2:
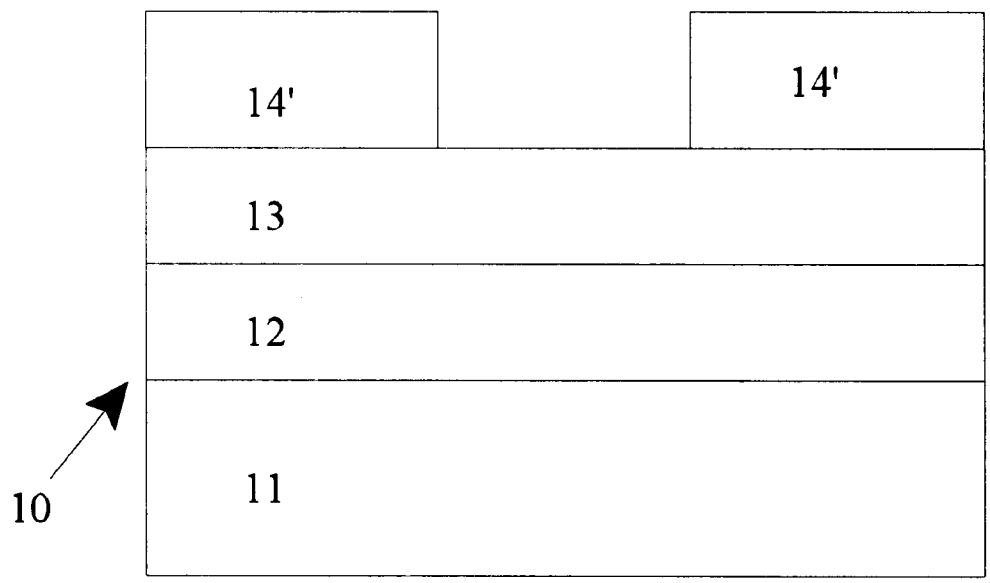
FIG. 2 shows the four layers in the same typical photomask after excess photoresist has been exposed to a light source and removed.
Figure 3:
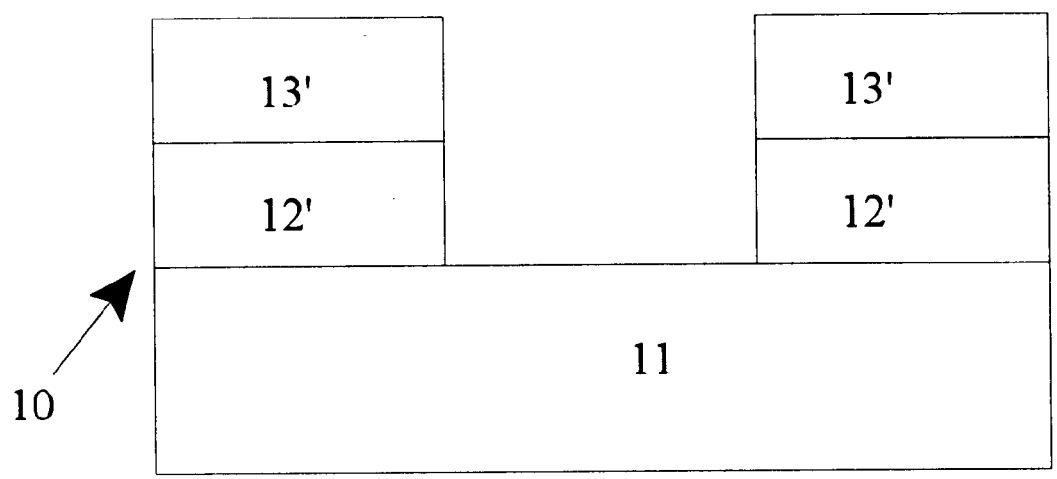
FIG. 3 shows the three layers in the same typical photomask after processing is completed.
Figure 4:
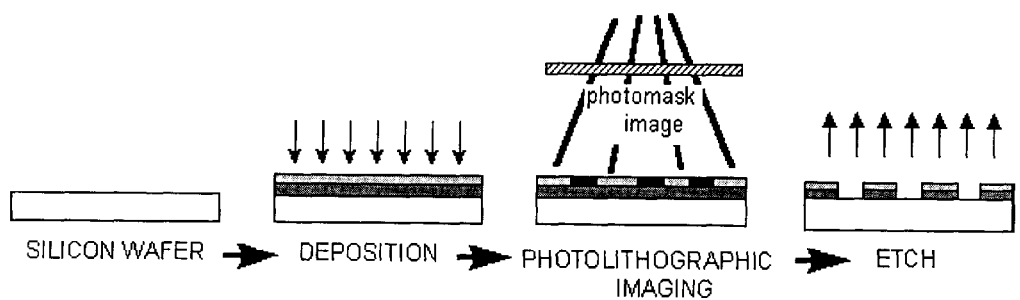
FIG. 4 schematically shows the process in which completed photomasks are used to manufacturer semiconductor devices.
Figure 5:
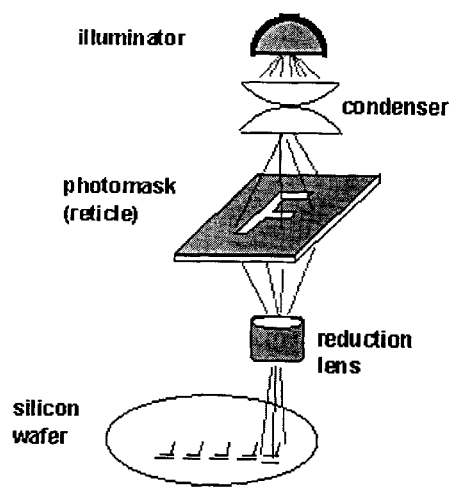
FIG. 5 shows how a completed photomask is used in a stepper to manufacturer semiconductor devices.

The present invention relates to an automated manufacturing system and method for manufacturing photomasks wherein information provided by a customer at a remote location is interfaced, via a network, to a photomask manufacturer's computer system and automatically processes data for manufacturing a photomask and automatically formats and routes data to processing equipment. The present invention reduces the need for manual intervention, thereby avoiding costly delays and transcription errors associated therewith.

As discussed herein, a photomask is typically required to manufacture a semiconductor and other devices. As is often the case, a semiconductor manufacturer will out source the task of manufacturing a photomask to a company which specializes in the manufacture of photomasks. Such semiconductor manufacturers, however, must first design the photomask to be manufactured. In this regard, the semiconductor manufacturer will develop certain data and specifications to be provided to the photomask manufacturer. More specifically, the semiconductor manufacturer (hereinafter, "the customer") will generate on its computer: (1) pattern data; and (2) other specific information relating to the specific job, which are often provided in an industry standard format such as the SEMI P-10 form, but may be provided in other custom formats.

Pattern data is typically generated in the form of a drawing and typically shows the various shapes and lines to be included on a photomask. The pattern data, however, is not necessarily to scale. In other words, the pattern data does not necessarily include the necessary specifications corresponding to the pattern data, including, but not limited to information such as the critical dimensions of the pattern, the shades of color to be used in different regions of the pattern, the registration information, actual placement of the pattern of the mask, exposure information, inspection information, etc. Rather, the pattern data only shows the overall shape of the pattern to be etched on a photomask.

Accordingly, in addition to providing pattern data, the customer also provides additional necessary information to the manufacture in order to perform the processing steps, typically in the SEMI P-10 form. The SEMI P-10 is a data structure specification intended to facilitate the transmittal of photomask order data between software systems to allow the automatic processing of such orders by photomask manufacturers. The SEMI P-10 form, which has been revised over the years, includes such information as, for example, customer information, critical dimension information, tone information, registration information, billing information, format codes for the pattern information being separately provided, dimension and scale factors for the completed photomask, fracturing scale, substrate and pellicle types, etc. The SEMI-P10-0301 standard, as well as its predecessors, are incorporated herein by reference as examples of identifying the type of information that could be included in the data transfer from a customer to a photomask manufacturer. For ease of reference, the non-pattern information which is electronically provided by the customer is referred to herein as the SEMI Specification. It should be noted, however, that the present invention is not limited to the current version of the SEMI P-10 standard and could be easily modified to conform to any future changes in such standard. Any electronic format which can be parsed may be used with the present invention. Further, the present invention is not limited to even standard formats and can also be applied to custom formats which also for ease of reference are referred to herein as the SEMI Specification.

Once the customer generates the SEMI Specification and the pattern data, the customer electronically transfers this information, over a network via network protocol, from the customer's facilities (hereinafter, "the Customer System") to a manufacturer's interface computer server, which in a preferred embodiment may be located in the photomask manufacturer's processing facilities and is part of the photomask manufacturer's computer network (hereinafter, "the Manufacturer's Computer Network"). In a preferred embodiment, the Customer's System may communicate with the Manufacturer's Computer Network over a TCP/IP based network (e.g., the Internet) wherein file transfer protocol ("FTP") is used to transfer the pattern data and SEMI Specification. The present invention could also use other protocols, such as parsing an attachment of an e-mail or be downloaded from other media. Additionally, the Customer's System is an FTP client and the photomask manufacturer's interface computer server is an FTP server. Once the FTP server receives the pattern data and SEMI Specification, either together or separately, the FTP server routes this information to other computers on the Manufacturer's Computer Network connected to the FTP Server for processing.

In a preferred embodiment, Parsing Software is included within the FTP Server to implement postjobprocess and does two basic things. First, the Parsing Software examines the files that have just been transferred to the FTP Server and copies them, as appropriate (and if configured to do so), to predefined working data directories. Second, the Parsing Software logs everything it does to an audit trail mail message which it then sends out to any number of preconfigured mail addresses. These mail addresses can be programmed to vary depending upon the incoming customer, or facility in which the processing is to take place. This mail message is both a customer acknowledgment and a internal notification that a data transfer has taken place.

In a preferred embodiment, the pattern data is routed by the Parsing Software to a Memory Pool connected to the FTP Server and stored therein for later processing. Alternatively, the pattern data could be transferred through other conduits, or may be stored in the FTP Server.

Similarly, in a preferred embodiment the SEMI Specification is routed by the Parsing Software to another computer server in the Manufacturer's Network for processing ("the Processing Server"), which is connected either directly or remotely by a network connection to the FTP Server. Alternatively, the FTP Server and the Processing Server could be the same computer. The Processing Server includes software ("the SEMI Software") for processing SEMI Specification files which automatically extracts or parses data from the SEMI Specification to be processed and/or formatted for use with manufacturing equipment. Such processing and/or formatting may occur either on the same computer server as the Processing Server or on other computer servers on the Manufacturer's Network.

Figure 9:
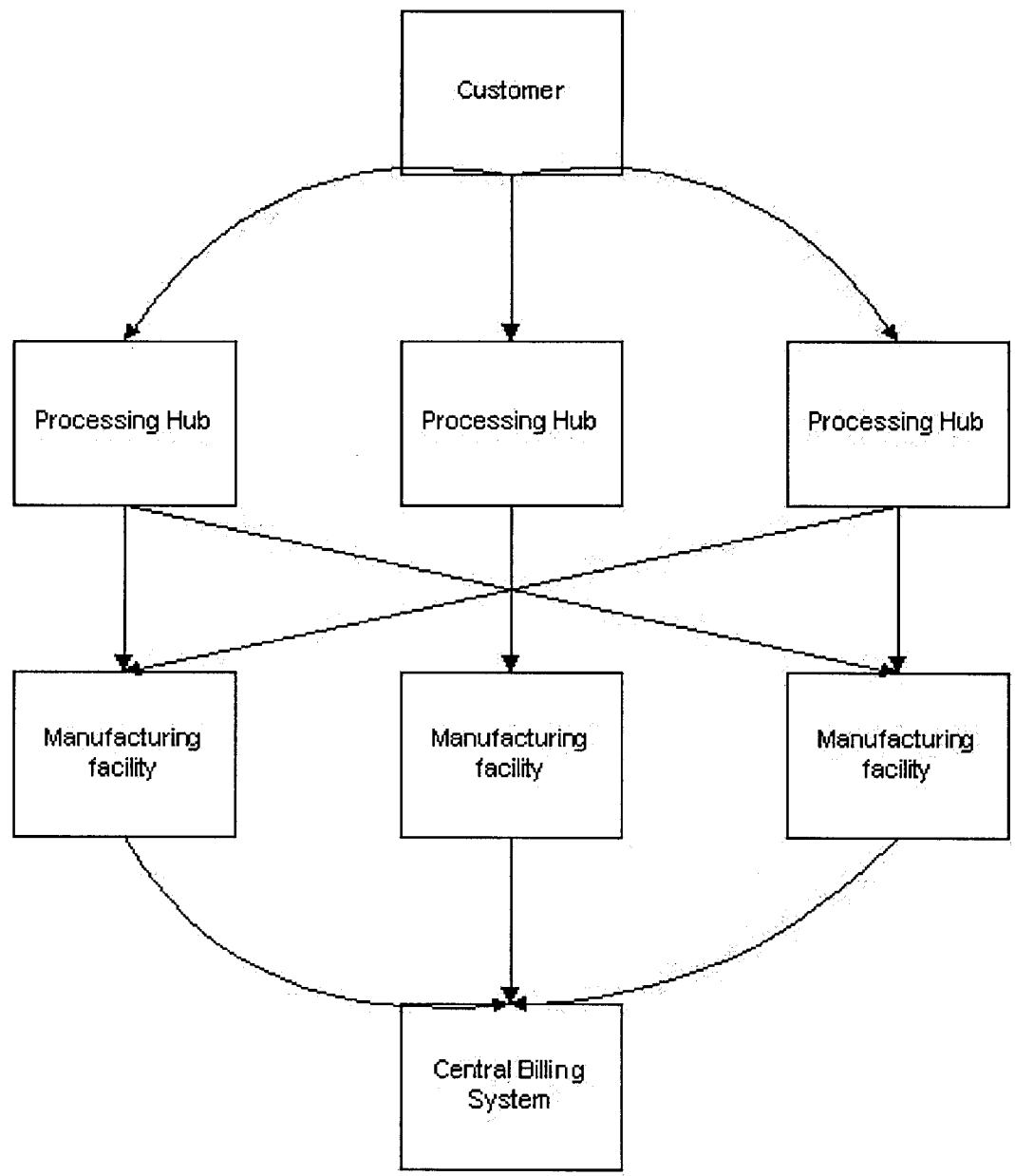
FIG. 9 is a block diagram showing an alternative multi-facility configuration of the present invention shown in FIG. 6.

In another embodiment, as shown in FIG. 9, remote manufacturing facilities can also be equipped with additional Processing Servers having the same or similar SEMI Software installed thereon. Thus, it is possible to enable a multitude of remote manufacturing facilities in other locales to interface, via a network connection, to the FTP Server. As a result, customer data received by the FTP Server can be routed for processing to a variety of remote manufacturing facilities in accordance with the present invention.

In a preferred embodiment, at the start of processing this data, the SEMI Software automatically notifies those persons who will be involved in the manufacture of the photomask corresponding to the SEMI Specification that an order for a photomask has been received. This notification feature can be automatically triggered when the SEMI Specification is received. More particularly, the notification feature automatically generates a message sent to a distribution list of the names of people who will be involved in the manufacture of the photomask corresponding to the SEMI Specification. This distribution list can be established by any predetermined criteria. In one embodiment, the distribution list is established by the location of the Processing Server on which the SEMI Software is installed. Thus, for example, where the SEMI Software is installed on a Processing Server located in a facility located in Texas, the distribution list will include the names of only those persons located in that facility. By contrary example, if the SEMI Software is installed on a Processing Server located in a facility located in Connecticut, the distribution list will include the names of only those persons located in that facility. Once the message is generated, each person on the distribution list may be automatically notified that an order for a photomask has been received. Such notifications may include e-mail, beepers, mobile telephones, etc. This automatic notification process can be set up anywhere in the Manufacturer's Network and be triggered by any processing step that the manufacturer desires. This example should not be treated as limiting to the present invention and is merely illustrative of the type of notification system that can be incorporated with the present invention.

Figure 7:
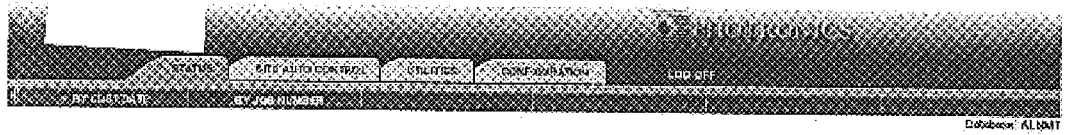
FIG. 7 is a screen shot of the data array implemented in the Processing Server of the present invention.

Next, the SEMI Specification is processed. In this regard, the SEMI Software may include features which automatically extract data from the SEMI Specification, arranges the extracted data according to manufacturing tasks to be performed, and generates a data array in which the arranged data is stored. In the preferred embodiment and as shown in FIG. 7, the data array includes information identifying the customer ("Enterprise"), customer wafer fab ("FAB"), the technology implemented ("Technology"), the job number, the customer design information for the photomask ("Device"), a status report as to the manufacture of the photomask ("Status"), and the date the order ("Order Rcvd") and/or the Semi Specification was received ("P-10 Received"). It should be noted, however, that the preferred data array could be easily modified to add additional descriptive categories when needed or show less categories if desired. Further, the data array could also include more detailed sub-data arrays which are linked to any of the above listed photomask information categories.

For example, a sub-data array could be hyperlinked to a particular JOB No. This sub-data array could include time and date stamped information documenting each step performed in the manufacture of the photomask.

Figure 6:
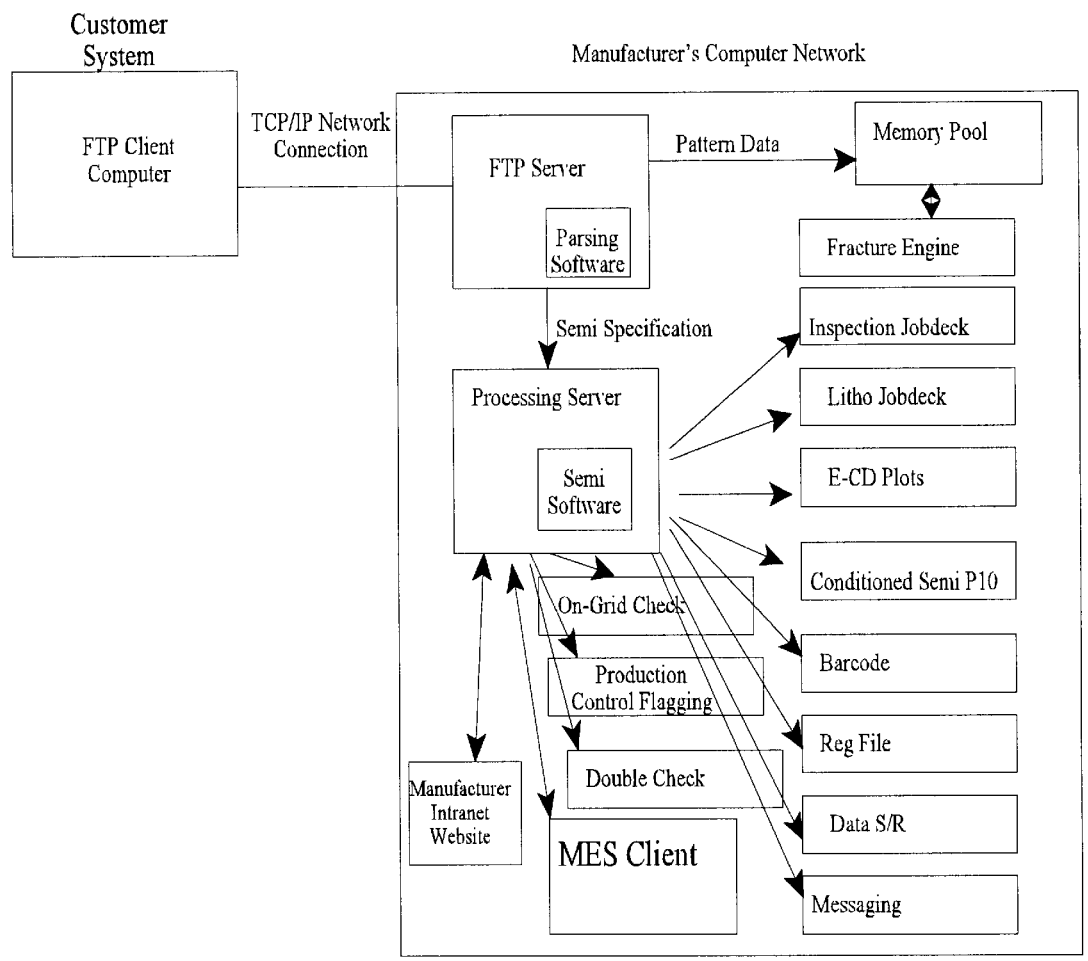
FIG. 6 is a block diagram showing a configuration of the automated manufacturing system of the present invention.

Additionally, a sub-data array could be hyperlinked to the Device category. In a preferred embodiment, this sub-data array includes data which has been extracted from the SEMI Specification and arranged for use in connection with a variety of manufacturing tasks which may need to be performed in manufacturing the photomask. These manufacturing tasks, for example, included but are not necessarily limited to, jobdeck processing ("Jobdeck"), electronic critical dimension plotting ("E-CD Plots"), SEMI specification conditioning ("SEMI"), bar coding ("Bar Code"), registration measure file creation ("REG MF2"), data sizing ("Data S/R"), double checking ("Double Chk"). Although not shown, this sub-data array may also include other manufacturing tasks such as, for example, fracturing, on-grid checking and flagging. Referring to FIG. 6, the SEMI Processing Software arranges and processes the extracted data according to these manufacturing tasks to be performed. Additionally, this sub-data array may include other information, including, but not limited to, a code name for the pattern to be formed on the photomask ("Layer"), the manufacturer's inventory control number ("Plate No"), the order in which each photomask should be processed according to the customer's preference ("Pri"), a status report on the manufacturing process for the photomask ("Layer Status") and the date on which the data was received by the SEMI Processing Software ("Data Rcd").

The manner in which data is organized in this sub-data array is now described. Jobdeck processing refers to the method by which instructions are transferred to and processed by lithography tools (e.g., E-beam and laser beam) and inspection equipment (e.g., KLA or Orbot). In the case of lithography jobdeck processing, certain instructions which are needed to write a pattern on a photomask blank are extracted from the SEMI Specification and stored in Jobdeck of the sub-data array shown in FIG. 8. These extracted jobdeck instructions are then processed by the SEMI Software for use with the lithography tools. These instructions indicate the location on the photomask in which the various patterns are to be placed, as well as other functions to be performed by the particular tool including but not necessarily limited to controlling exposure, scaling of patterns, and tone. Alternatively, the extracted job instructions may be modified to account for other information regarding the particular customer, its division or internal manufacturing site, etc., to generate the appropriate instructions for the lithography tools or other processing equipment. For example, jobdeck instructions may need to be routinely modified for a particular manufacturing center of a customer to account for the fact that the instructions provided by such customer require the pattern to be reversed by the lithography tools, which may be a time consuming process as compared to reversing the pattern when fracturing the pattern data.

With respect to inspection jobdeck processing, the relevant SEMI Specification instruction is extracted from and arranged for use by inspection equipment. These instructions are also stored in the jobdeck. The extracted SEMI Specification instructions for the inspection equipment should be arranged and formatted such that the inspection equipment can inspect a processed photomask for defects (e.g., die-to-data comparison) and contaminations (i.e., cleanliness).

Figure 8:
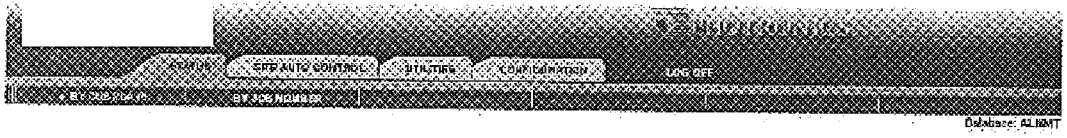
FIG. 8 is a screen shot of a sub-data array hyperlinked to the data array of FIG. 7 implemented in a Processing Server of the present invention.

SEMI Conditioning refers to a process by which the SEMI Specification provided by the customer is automatically modified to include additional details, be reformatted or otherwise arranged and/or remove extraneous details. In this regard, the SEMI Processing Software includes functions by which it can add various information to the SEMI Specification. For example, a customer's business requirements, such as a preferred delivery address, can be automatically added to the SEMI Specification and stored in SEMI as shown in FIG. 8. Likewise, manufacturing information can also be added to the SEMI Specification and stored in sub-data array. In this regard, the SEMI Software is programmed to adjust certain data (e.g., critical dimensions, biasing information, pellicle type) based on various circumstances (e.g., modifications based on peculiarities of the manufacturer's equipment or specific customer requirements) which may arise in the manufacturing process that have not been taken into account by the customer, or in the customer's SEMI Specification.

Additionally, the SEMI Software automatically generates instructions for the fracture engine to fracture the pattern data. Fracturing is a well known process whereby the pattern data is divided (i.e., fractured) into shapes and segments which the lithography tool can understand. In a preferred embodiment, the fracturing instructions are generated in the form of a "cinc" file. It should be noted, however, that the fracturing instructions may be in other formats as well. The fracturing instructions may be stored on the Processing Server or on a stand-alone separate Disk Memory Pool. A Fracture Engine Server interfaces with the Processing Server or Disk Memory Pool to read the fracturing instructions and fracture the pattern data.

Further, bar coding refers to the process by which bar codes are applied to a photomask. More specifically, certain customers may desire to include a bar code on its photomasks for inventory tracking purposes. Thus, where the customer has included information in the SEMI Specification for such bar codes, the SEMI Processing Software extracts this data, formats it, and creates pattern data in a form usable by the Lithography Tools. The Lithography Tools are directed to the bar code pattern data by the Litho Jobdeck Instructions to use it to write the bar code on the photomask.

The process of creating registration measure files refers to a method by which a file is created that contains coordinates which the inspection tools will use to align the photomasks. These coordinates can be used together to expose an image on a semi-conductor. The registration information may also be used in the semiconductor manufacturing process to align the photomask with the semiconductor wafer, or other photomask layers. The SEMI Software extracts from the SEMI Specification the appropriate data for creation of the registration measure file and formats such data for equipment which performs the registration inspection process. In this regard, the registration files can be in a variety of formats, including, but not limited to, .MF2 files, .MF3 files, critical dimension files, etc.

The process of data sizing and reversing refers to a method by which the size and tone of patterned data is modified to facilitate processing of the photomask in the manufacturing process. The SEMI Software extracts the appropriate instruction from the SEMI Specification and creates the fracture instructions for the data sizing operation.

These instructions are typically stored in a cinc file. The status of the performance of this process is tracked in Data S/R in FIG. 6.

Additionally, the process of production control flagging refers to a feature which determines the appropriate manufacturing facility in which a particular customer order will be processed. For example, where a photomask manufacturer includes manufacturing facilities in Texas and California, the SEMI Software analyzes the customers order (i.e., SEMI Specification) and determine whether the photomask will be manufactured in Texas or California, or some combination thereof. The production control flagging features can be set to make this determination based on any variety of criteria, including, but not limited to, the lithography tools used at each manufacturing site, the customer's preference, and the work load at each facility.

The double checking feature refers to a process which compares for the accuracy in the pattern data which has been sized with the specifications provided by the customer. The SEMI Software extracts data from the SEMI Specification and arranges it to be read by equipment which performs this double checking feature.

On-grid check refers to the process of comparing the placement of pattern data in the jobdeck to the internal placement "grid" of the Lithography tool. A pattern is considered off grid if the finite placement coordinate point falls between the points of the Litho tools internal grid.

Another feature of the present invention is an automated messaging feature which is programmed to recognize and report errors and other occurrences (i.e., that a process has started or ended) to members of the distribution list discussed herein. This feature can be used as described above with respect to the FTP Server and the Processing Server.

Additionally, electronic critical dimensions plots ("E-CD Plots") refers to the process by which an electronic picture of the pattern data on the photomask which has been processed is marked with internal reference marks for quality control purposes. As relevant here, the SEMI Processing Software extracts the necessary instructions for E-CD Plotting from the SEMI Specification and typically creates a cinq file for the fracture engine to use in creating plot files and stores them to the Disk Memory Pool.

Depending upon the format in which the SEMI Specification is provided, some or all of manufacturing tasks may or may not need to be performed. Thus, any of the manufacturing tasks listed in the data array may be optionally disabled. The manner in which the data will be arranged for each of these processing functions will vary according to the specification provided by the customer. Nevertheless, the data should be arranged such that each of the functions could be performed.

This system also includes an automated and interactive monitoring system which provides for prompt identification and notification of the status of any manufacturing tasks as well as errors encountered in performing such tasks. Referring to FIGS. 7 and 8, in a preferred embodiment, this interactive monitoring system is provided in the form of a web site on an intranet which can be accessed via a secure authentication, including but not limited to a password. Alternatively this web site could also be accessed on the World Wide Web, and/or any other web, either by authentication or not. Once this web site is entered, a technician can view the status of each manufacturing task. If any errors have occurred, the technician can stop that particular manufacturing task, correct the error, and restart the process.

Additionally, a manufacturing execution system ("MES") can be installed on a client computer which may also be interfaced by the Processing Server. MES systems are well known in the art and provide a system user with the capability of tracking the manufacturing process, generating billing information, and down loading the results of the various manufacturing tasks discussed herein.

The present invention may also be used to interface and automatically pass conditioned data to any MES system which implements a standard or custom protocol, including but not limited to XML, SOAP, ebXml, Rosetta Net and other like protocol.

Other tasks can be included, although not shown in FIG. 6, such as process determination, which is the automated tool selection process. In particular, in process determination, the particular unit or type of processing equipment to be utilized in the manufacture of the photomask (e.g., the specific litho or inspection tool) is specified. This information may be specified either by the customer or as a result of the site chosen to perform the particular task.

Now that the preferred embodiments of the present invention have been shown and described in detail, various modifications and improvements thereon will become readily apparent to those skilled in the art. Accordingly, the spirit and scope of the present invention is to be construed broadly and limited only by the appended claims and not by the foregoing specification.

What is claimed is:

1. An automated system used for manufacturing a photomask comprising:
at least one server for electronically receiving photomask order data in varying formats from a photomask customer;
software for processing said photomask order data, wherein said software is configured to automatically extract information from said photomask order data and arrange said extracted data in different formats suitable for specified photomask manufacturing tasks;
a data array for storing said extracted and arranged information; and
a plurality of photomask manufacturing task stations interfaced to said data array.

2. The automated system of claim 1, said customer design data further comprises at least one SEMI specification and at least one pattern data file.

3. The automated system of claim 2, wherein said plurality of manufacturing task stations further comprises a jobdeck, a fracture engine and a processor for conditioning said SEMI specification.

4. The automated system of claim 1, wherein said server comprises an FTP server.

5. The automated system of claim 4, further comprising a processing server.

6. The automated system of claim 4, wherein said software is SEMI Software.

7. The automated system of claim 6, wherein said SEMI Software comprises a notification feature for notifying individuals involved in manufacturing said photomask when photomask order data has been received.

8. The automated system of claim 1, wherein said software comprises parsing software.

9. The automated system of claim 8, wherein said parsing software is configured to copy files into predefined work data directories.

10. The automated system of claim 8, wherein said parsing software is configured to log each of its activities to at least one audit trail mail message.

11. The automated system of claim 10, wherein said at least one audit trail mail message is pre-configured with mail addresses.

12. The automated system of claim 10, further comprising an electronic log file.

13. The automated system of claim 1, further comprising a memory pool.

14. The automated system of claim 1, wherein said data array comprises categories of information identifying the customer, customer wafer fab, technology implemented, job number, customer design information for the photomask, a status report and/or order date.

15. The automated system of claim 14, wherein each of said categories of information of said data array is further defined by at least one sub-data array.

16. The automated system of claim 15, wherein said sub-data array is associated with at least one manufacturing task.

17. The automated system of claim 16, wherein said manufacturing task comprises jobdeck processing, electronic critical dimension plotting, SEMI specification conditioning, bar coding, registration measure file creation, data sizing and/or double checking.

18. The automated system of claim 1, wherein said software is configured to generate instructions for fracturing data.

19. The automated system of claim 18, further comprising a fracture engine server.

20. The automated system of claim 1, wherein said photomask manufacturing task stations comprises a fracture engine.

21. The automated system of claim 1, wherein said at least one server is interfaced to a manufacturing execution system.

22. An automated system used for manufacturing a photomask comprising:
   at least one server for electronically receiving photomask order data in varying formats from a photomask customer;
   software for processing said photomask order data, wherein said software for processing is configured to automatically extract information from said photomask order data and arrange said extracted data in different formats suitable for specified photomask manufacturing tasks;
   at least one processing tool used in the manufacture of photomasks to perform said photomask manufacturing tasks;
   software for tracking the status of the at least one processing tool in real time and notifying one or more system users of said status.

23. The automated system of claim 22, wherein said at least one processing tool is a lithography tool.

24. The automated system of claim 22, wherein said at least one processing tool is an inspection tool.

25. The automated system of claim 22, wherein said system comprises at least two processing tools, and said software for tracking the status of said at least one processing tool also tracks the status of said at least two processing tools.

26. The automated system of claim 22, wherein said software for tracking the status of said at least one processing tool is a website maintained on an intranet.

27. The automated system of claim 22, wherein said software for tracking the status of said at least one processing tool is a website maintained on the Internet.

28. An automated system used for manufacturing a photomask comprising:
   at least one server for electronically receiving order data in varying formats from a photomask customer;
   software for processing said photomask order data, wherein said software for processing is configured to automatically extract information from said customer order data and arrange said extracted data in different formats suitable for specified photomask manufacturing tasks; and wherein said software for processing modifies said extracted information to account for the processing steps that are intended to actually be performed in manufacturing said photomask.

29. An automated system used for manufacturing a photomask comprising:
   at least one server for electronically receiving photomask order data in varying formats;
   software for processing said photomask order data, wherein said software for processing is configured to automatically extract information from said photomask order data and arrange said extracted data in different formats suitable for specified photomask manufacturing tasks; and wherein said software for processing modifies said extracted information to account for the processing steps that are intended to be performed by a photomask customer.

30. An automated system used for manufacturing a photomask comprising:
   at least one server for electronically receiving photomask order data in varying formats from a photomask customer;
   software for processing said photomask order data, wherein said software for processing is configured to automatically extract information from said customer order data and arrange said extracted data in different formats suitable for specified photomask manufacturing tasks;
   at least one processing tool used in the manufacture of photomasks to perform said photomask manufacturing tasks;
   an automated messaging feature configured to recognize and report errors and/or progress of a manufacturing task.

* * * * *